(12) United States Patent
Hsiao et al.

(10) Patent No.: US 8,721,157 B2
(45) Date of Patent: May 13, 2014

(54) BACKLIGHT MODULE STRUCTURE PREVENTING LIGHT LEAKAGE FROM PROTRUSION IN OPTICAL SHEETS

(75) Inventors: Yu-Ling Hsiao, Hsin-Chu (TW); Chien-Hua Chen, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 67 days.

(21) Appl. No.: 13/464,001

(22) Filed: May 4, 2012

(65) Prior Publication Data

US 2013/0083557 A1   Apr. 4, 2013

(30) Foreign Application Priority Data

Sep. 30, 2011   (TW) .............................. 100135581 A

(51) Int. Cl.
*F21V 8/00* (2006.01)
(52) U.S. Cl.
USPC .......................................................... 362/633
(58) Field of Classification Search
USPC ........ 349/58, 62, 64, 65; 362/97.1–97.3, 608, 362/628, 632–634
See application file for complete search history.

(56) References Cited

U.S. PATENT DOCUMENTS

| | | | |
|---|---|---|---|
| 6,175,396 B1 * | 1/2001 | Kim et al. | 349/58 |
| 6,587,355 B2 * | 7/2003 | Park et al. | 361/799 |
| 2005/0259444 A1 * | 11/2005 | Choi | 362/633 |
| 2007/0126947 A1 * | 6/2007 | Yu | 349/58 |
| 2008/0143918 A1 * | 6/2008 | Kim | 349/58 |
| 2008/0291356 A1 * | 11/2008 | Kim | 349/58 |
| 2011/0157519 A1 * | 6/2011 | Yusa | 349/64 |

FOREIGN PATENT DOCUMENTS

| | | |
|---|---|---|
| CN | 1800940 A | 7/2006 |
| CN | 101592319 A | 12/2009 |
| JP | 2009-265237 | 11/2009 |
| TW | 581264 | 3/2004 |
| TW | 200734751 | 9/2007 |
| TW | I287153 | 9/2007 |
| TW | M329792 | 4/2008 |
| TW | 201135317 | 10/2011 |

\* cited by examiner

*Primary Examiner* — Nimeshkumar Patel
*Assistant Examiner* — Steven Horikoshi
(74) *Attorney, Agent, or Firm* — WPAT, PC; Justin King

(57) ABSTRACT

A backlight module comprises a frame, a light source, an optical film and a light blocking element or a light reducing element. The frame has at least one recess formed on a sidewall thereof. The light source is disposed in the frame and located on one side thereof. The optical film is disposed in the frame and has at least one protrusion portion corresponding to the recess. The light blocking element or the light reducing element is disposed corresponding to the recess. By utilizing the light blocking element or the light reducing element, the light emitting from the light source can be block from leaking through the recess or the amount of the emitting light being reflected by a bezel of the frame can be reduced, whereby the amount of light leaking though the recess can be reduced.

3 Claims, 8 Drawing Sheets

BACKLIGHT MODULE STRUCTURE PREVENTING LIGHT LEAKAGE FROM PROTRUSION IN OPTICAL SHEETS

FIELD OF THE INVENTION

The present invention relates to a backlight module structure, more particularly to a light leakage-proof backlight module structure.

BACKGROUND OF THE INVENTION

With the development of the optical and electronic technologies, liquid crystal displays (LCD) have been widely applied in electrical devices, such as televisions (TV), monitors, notebooks, personal digital assistant (PDA) and cell phones. Since an LCD is a non-self-light-emission plane display device, an external light source, such as a backlight source or a sidelight source, is thus necessary to the LCD. Accordingly, a backlight module with high luminance and uniformity becomes an essential light source of the LCD used to efficiently provide a high quality image.

FIG. 1 is an exploded view illustrating a traditional backlight module 200 of an LCD. The backlight module 200 includes a bezel 201, a frame 204, a light source 212, a reflecting sheet 216, a light guide plate 214 and a plurality of optical films 210, by which the light emitting from the light source 212 and then reacting with the light guide plate 214 and the reflecting sheet 216 can be transformed into a plane light source. The frame 204 which is disposed in the bezel 201 and has a main part 204a and a containing space 205. The light source 212 is disposed in the containing space 205. The reflecting sheet 216, the light guide plate 214 and the optical films 210 are sequentially stacked in the containing space 205. Each of the optical films 210 has at least one protrusion portion 210a, and the main part 204a of the frame 204 has at least one notch 204b or through-hole 204c corresponding to the protrusion portion 210a of the optical films 210, whereby the optical films 210 can be easily assembled on the frame 204 in accordance with the position of the notch 204b or the through-hole 204c.

FIG. 2 illustrates the detailed structure of the main part 204a of the frame 204 having the notch 204b formed thereon. FIG. 3 is a cross sectional view of the frame 204 depicted along the cutting line A-A' shown in the FIG. 2; and FIG. 4 is a cross sectional view of the frame 204 depicted along the cutting line B-B' shown in the FIG. 2. For the purpose of clearly description, FIGS. 3 and 4 further illustrate elements other than the frame 204, such as the bezel 201, the light guide plate 214, the reflecting sheet 216, the optical films 210 and a panel 219 of an LCD in order to distinguish the correlations among those elements. Referring to FIG. 3, because the emitting light of the light source 212 (not shown) passing through the light guide plate 214 may be blocked by the frame 204, thus the light may hardly leak there from. However, undesired light leakage may occur at other points. Referring to FIG. 4, because there exists a notch 204b or a through-hole 204c formed on the frame 204, thus the light emitting form the light guide plate 214 may leak out of the bezel 201 without any obstruction, so as to result in a severe lateral light leakage problem.

Traditionally, a viewing angle inspection may be carried out before an LCD is delivered, in order to keep the LCD having a horizontal viewing angle ranging around 20 degree and a vertical viewing angle ranging around 40 degree. Currently, in order to satisfy the customer requirement, an LCD with a wide viewing angle is provided, wherein the viewing angle is enlarged to 85 degree. However, as the viewing angle is enlarged, the problems of light leakage may get worse and worse, especially at the position on which the notch 204b or a through-hole 204c is formed (shown in the FIG. 4). Therefore, how to prevent light of an LCD with a wide viewing angle leaking from the notch or the through-hole is still a challenge to the art.

SUMMARY OF THE INVENTION

One aspect of the present invention is to provide a backlight module to prevent an LCD with a wide viewing angle from light leakage.

Another aspect of the present invention is to provide a backlight module to reduce light leakage problems occurring in an LCD with a wide viewing angle.

In one embodiment of the present invention, a backlight module is provided, wherein the backlight module comprises a light source, a frame, an optical film and a light blocking element. The frame has at least one recess formed on the sidewall thereof. The optical film having at least one protrusion portion is disposed in the frame, and the protrusion portion is installed in accordance with the position of the recess. The light blocking element is disposed in the recess in order to block the emitting light of the light source from leaking via the recess.

In another embodiment of the present invention, a backlight module is provided, wherein the backlight module comprises a light source, an outer frame, an inner frame, an optical film and a light reducing element. The frame has at least one recess formed on the sidewall thereof. The optical film having at least one protrusion portion is disposed in the frame, and the protrusion portion is installed in accordance with the position of the recess. The light reducing element is disposed corresponding to the recess used to reduce the amount of emitting light of the light source being reflected by the outer frame and subsequently leaking via the recess.

In accordance with the aforementioned embodiments of the present invention, the recess can be a notch or a through-hole. The material used to constitute the light blocking element or the light reducing element is selected from a group consisting of an adhesive tape with high light absorption or reflection, rubber, silicone, polyethylene terephthalate (PET), poly(methyl methacrylate-co-ethyl acrylate) (PMMA), sponge poron and the arbitrary combination thereof.

The above objects and advantages of the present invention will become more readily apparent to those ordinarily skilled in the art after reviewing the following detailed description and accompanying drawings.

DETAILED DESCRIPTION OF PREFERRED EMBODIMENTS

Figure 1:
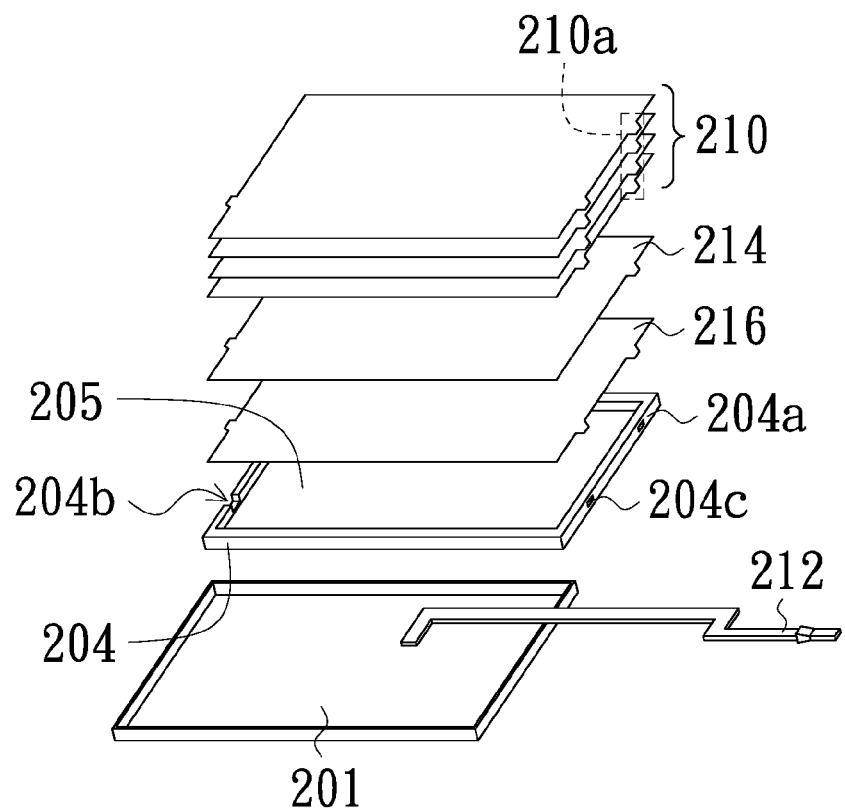
FIG. 1 is an exploded view illustrating a traditional backlight module of an LCD.
Figure 2:
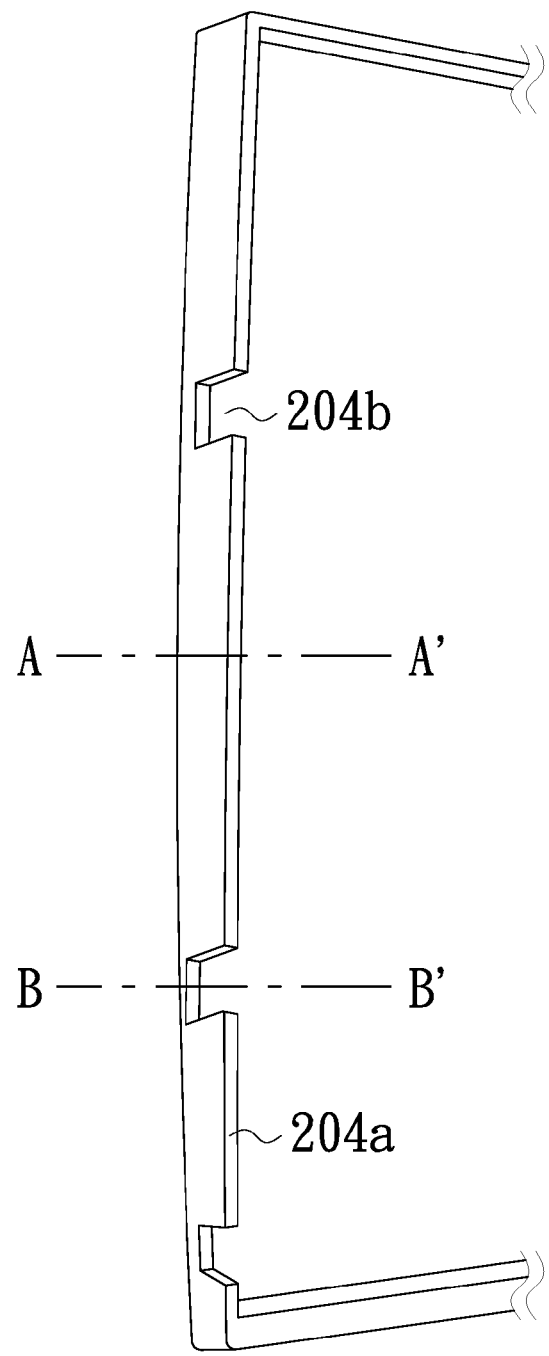
FIG. 2 illustrates the detailed structure of the main part of the frame having the recess formed thereon.
Figure 3:
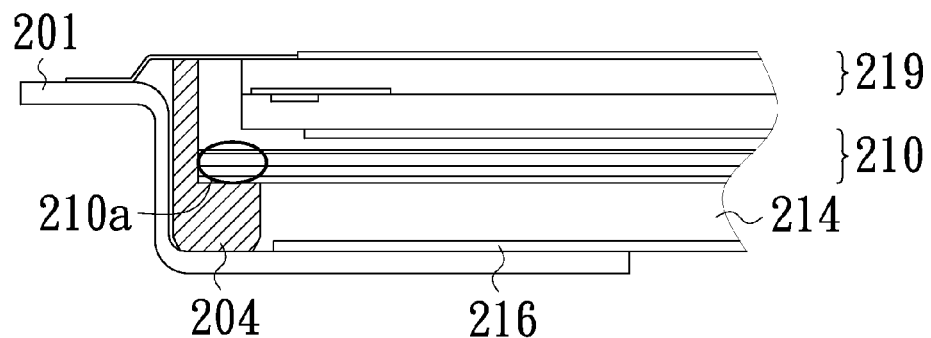
FIG. 3 is a cross sectional view of the frame depicted along the cutting line A-A' shown in the FIG. 2.
Figure 4:
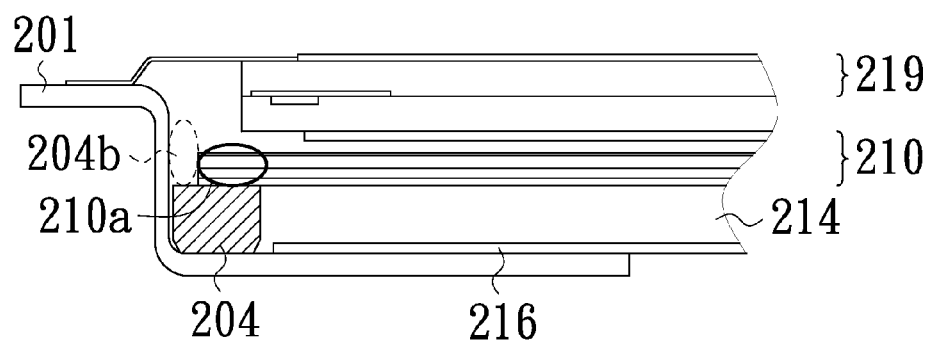
FIG. 4 is a cross sectional view of the frame depicted along the cutting line B-B' shown in the FIG. 2.
Figure 5:
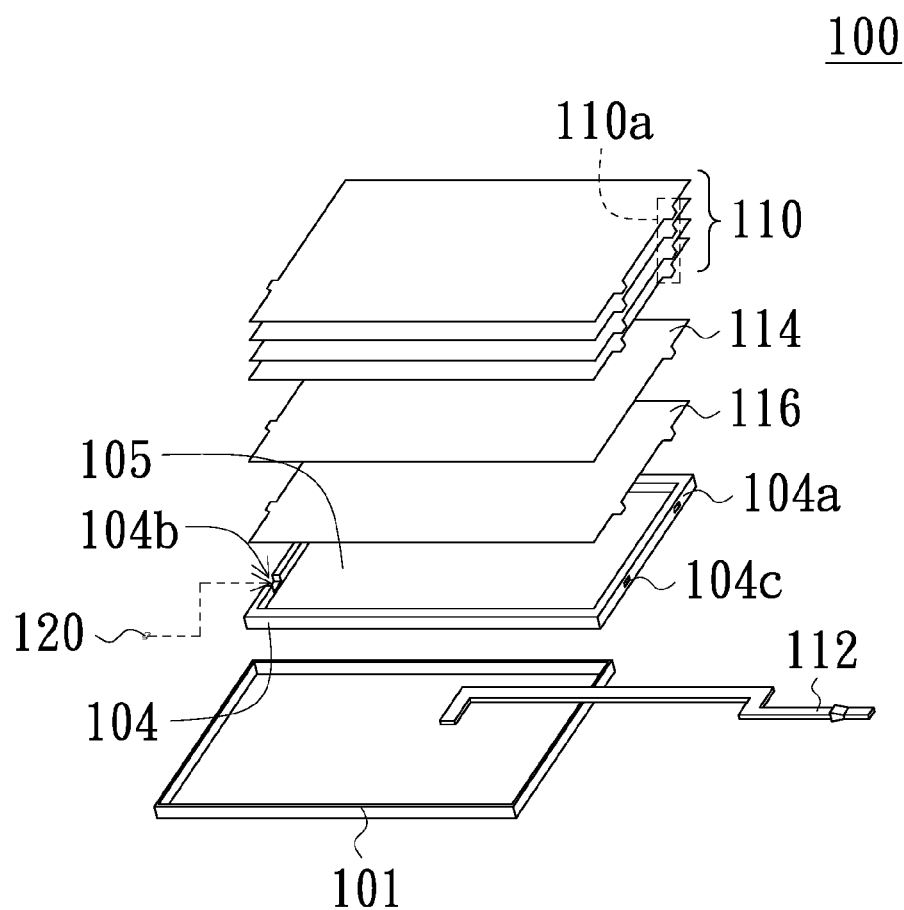
FIG. 5 is an exploded view illustrating a backlight module having a light blocking element in accordance with one embodiment of the present invention.

FIG. 5 is an exploded view illustrating a backlight module 100 having a light blocking element 120 in accordance with one embodiment of the present invention. The backlight module 100 comprises a bezel 101, a frame 104, a light source 112, a reflecting sheet 116, a light guide plate 114, a plurality of optical films 110 and a light blocking element 120. The frame 104 is disposed in the bezel 101 and has a main part 104a and a containing space 105. The light source 112 is disposed at one side of the containing space 105 which is located in the frame 104. The reflecting sheet 116, the light guide plate 114 and the optical film 110 are sequentially stacked in the containing space 105. Each of the optical films 110 has at least one protrusion portion 110a, and the main part 104a of the frame 104 has at least one recess formed corresponding to the arrangement of the protrusion portions 110a of the optical films 110. As shown in FIG. 5, the recess can be a notch 104b or a through-hole 104c functioning as a positioner used to help the optical films 110 installed on the frame 104. Thus the recess form is not limited, any other structures having the same functions may be appropriate. In some embodiments, the light blocking element 120 is disposed in the recess in order to fill the recess upwards to the level substantially equal to the surface of the frame 104, so as to prevent the emitting light of the light source 112 from leaking via the recess.

Figure 6:
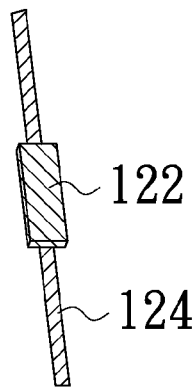
FIG. 6 is a diagram illustrating the structure of a light blocking element in accordance with one embodiment of the present invention.
Figure 7:
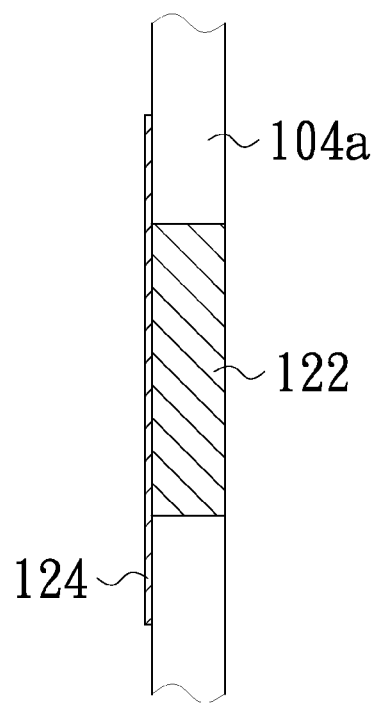
FIG. 7 is a diagram illustrating the way of using the rubber block to fill the notch and pasting the adhesive tape to the outer wall of the frame in order to secure the rubber block fixed on the frame.

FIG. 6 is a diagram illustrating the structure of a light blocking element 120 in accordance with one embodiment of the present invention. In the present embodiment, the light blocking element 120 is a combinative structure consisting of a rubber block 122 and an adhesive tape 124. The rubber block 122 is used to fill the notch 104b, and the adhesive tape 124 is used to secure the rubber block 122 fixed on the frame 104, so as to prevent the rubber block 122 from falling off the frame 104. The adhesive tape 124 can be pasted on the outer wall or the inner wall of the frame 104. FIG. 7 is a diagram illustrating the way of using the rubber block 122 to fill the notch 104b and pasting the adhesive tape 124 to the outer wall of the frame 104 in order to secure the rubber block 122 fixed on the frame 104. Besides, in some embodiments of the present invention, the adhesive tape 124 can also be pasted on the protrusion portion 110a to prevent the optical films 110 from falling off the frame 104.

Figure 8:
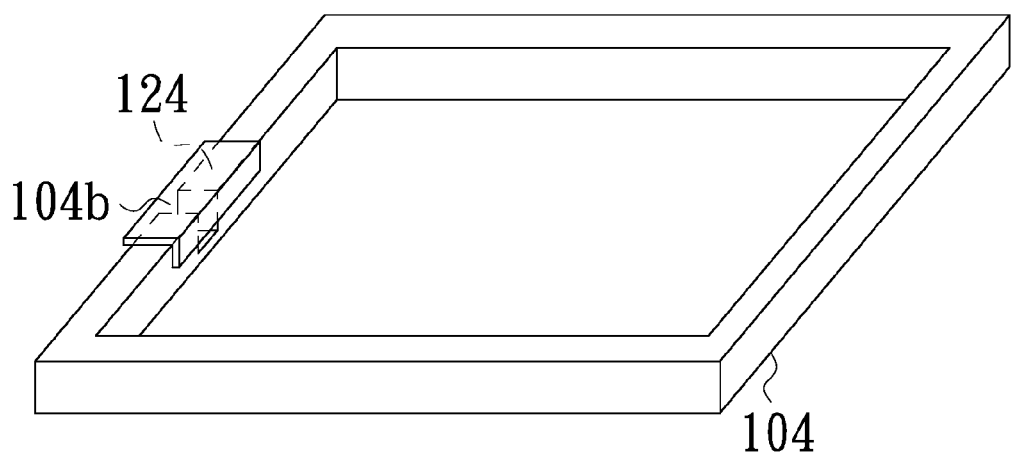
FIG. 8 is a diagram illustrating the structure of a light blocking element in accordance with another embodiment of the present invention.

FIG. 8 is a diagram illustrating the structure of a light blocking element 120 in accordance with another embodiment of the present invention. In the present embodiment, the light blocking element 120 is a masking tape 124 pasted on at least two adjacent sidewalls of the frame 104 on which the notch 104b is formed. For example, as long as there preserves space for accommodating the protrusion portion 110a, the masking tape 124 can be pasted on the outer wall of the frame 104 and vertically extending to the upper surface of the frame 104, or otherwise, can be pasted on the inner wall of the frame 104 and vertically extending to the upper surface of the frame 104 to achieve the object for blocking leaking light.

Materials having high light absorption or low light reflection, such as tape, rubber, silicone, PET, PMMA or sponge poron, can be taken alone or in combination to constitute the light blocking element 120. Materials especially with dark colors are preferable.

Soft gel material, such as thermo-plastic glue or plastic foam, or other suitable filling materials can also be selected to sever as the light blocking element 120. In some embodiments of the present invention, the filling materials can be directly injected into the recess, so as to fulfill the recess after these materials are hardened and then achieve the object for blocking leaking light.

Figure 9:
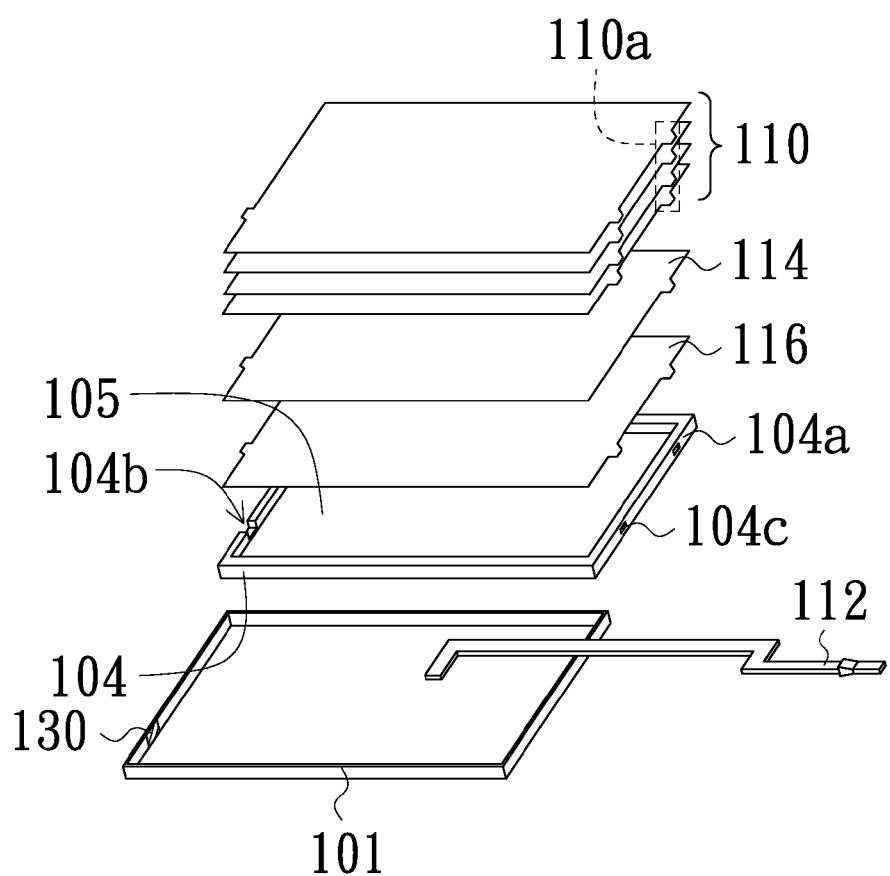
FIG. 9 is an exploded view illustrating a backlight module having a light reducing element in accordance with further another embodiment of the present invention.

FIG. 9 is an exploded view illustrating a backlight module 100 having a light reducing element 130 in accordance with further another embodiment of the present invention. The backlight module 100 comprises a bezel 101, a frame 104, a light source 112, a reflecting sheet 116, a light guide plate 114, a plurality of optical films 110 and a light reducing element 130. The frame 104 is disposed in the bezel 101 and has a main part 104a and a containing space 105. The light source 112 is disposed at one side of the containing space 105 which is located in the frame 104. The reflecting sheet 116, the light guide plate 114 and the optical films 110 are sequentially stacked in the containing space 105. Each of the optical films 110 has at least one protrusion portion 110a, and the main part 104a of the frame 104 has at least one recess formed corresponding to the arrangement of the protrusion portions 110a of the optical films 110. The recess may be a notch 104b, a through-hole 104c or other structures suitable for helping the optical films 110 installed on the frame 104. The light reducing element 130 is disposed corresponding to the recess in order to reduce the amount of light emitting from the light source 112 being reflected by the bezel 101 and subsequently leaking through the recess.

Figure 10:
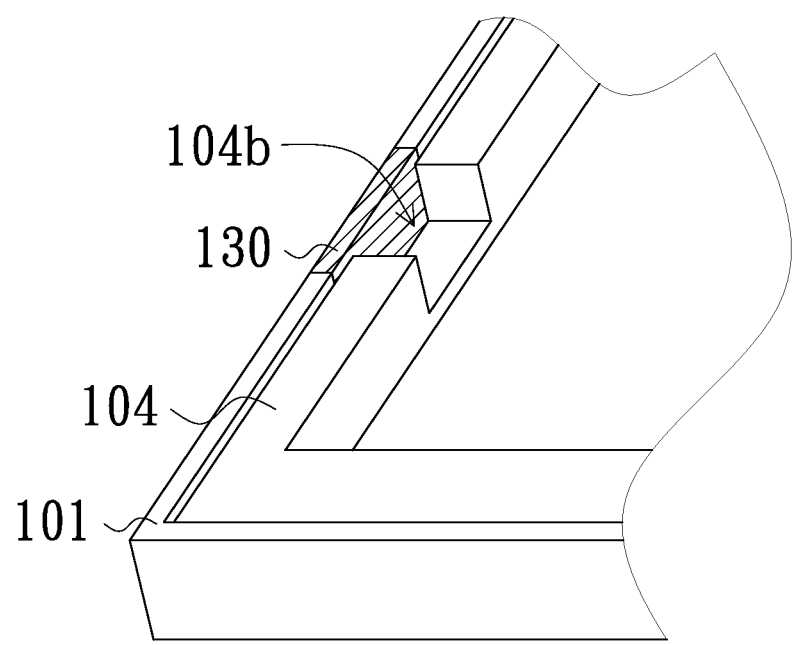
FIG. 10 is a diagram illustrating the structure of a light reducing element in accordance with one embodiment of the present invention.

FIG. 10 is a diagram illustrating the structure of a light reducing element 130 in accordance with one embodiment of the present invention. In the present embodiment, the light reducing element 130 is a masking tape pasted on the inner wall of the bezel 101 opposite to the recess used to reduce the amount of light emitting from the light source 112 being reflected by the bezel 101, whereby the amount of light leaking though the recess can be reduced.

The light reducing element 130 also can be pasted on the outer wall of the frame 104 on which the recess is formed or can be disposed between the bezel 101 and the frame 104 corresponding to the position of the recess. In some embodiments, the light reducing element 130 further comprises filling material which can be directly fill into the recess.

Materials having high light absorption or low light reflection, such as tape, rubber, silicone, PET, PMMA or sponge poron, can be taken alone or in combination to constitute the light reducing element 130. The filling material involved in the light reducing element 130 can be selected from a group consisting of thermo-plastic glue, plastic foam, rubber, silicone, PET, PMMA, sponge poron and the arbitrary combination thereof. Materials with dark colors are preferable.

In accordance with the aforementioned embodiments of the present invention, a backlight module 100 having a light blocking element 120 or a light reducing element 130 is provided. By utilizing the light blocking element 120 or the light reducing element 130, the light emitting from the light source 112 can be block from leaking through the recess or can be reduced being reflected by the bezel 101, whereby the amount of light leaking though the recess can be reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A backlight module comprising:
    a frame having at least one recess formed on a sidewall of the frame;
    a light source disposed in the frame and located at one side of the frame;
    an optical film disposed in the frame and having at least one protrusion portion installed corresponding to the recess; and
    a light blocking element disposed in the recess in order to block emitting light of the light source from leaking via the recess, wherein the light blocking element comprises:
        a rubber block used to fill the recess; and
        an adhesive tape used to secure the rubber block fixed on the frame.

2. The backlight module according to claim 1, wherein the recess is a notch or a through-hole.

3. The backlight module according to claim 1, wherein the adhesive tape is pasted on the protrusion portion.

\* \* \* \* \*